(12) United States Patent
Thelen et al.

(10) Patent No.: US 8,664,829 B2
(45) Date of Patent: Mar. 4, 2014

(54) PIEZO DRIVE

(75) Inventors: Marc Thelen, Karlsruhe (DE); Claudio Iseli, Balgach (CH); Heinz Bernhard, Berneck (CH)

(73) Assignee: Leica Geosystems AG, Heerbrugg (CH)

( * ) Notice: Subject to any disclaimer, the term of this patent is extended or adjusted under 35 U.S.C. 154(b) by 96 days.

(21) Appl. No.: 13/262,753

(22) PCT Filed: Mar. 17, 2010

(86) PCT No.: PCT/EP2010/053463
§ 371 (c)(1),
(2), (4) Date: Oct. 3, 2011

(87) PCT Pub. No.: WO2010/112341
PCT Pub. Date: Oct. 7, 2010

(65) Prior Publication Data
US 2012/0025670 A1 Feb. 2, 2012

(30) Foreign Application Priority Data
Apr. 3, 2009 (EP) ..................................... 09157257

(51) Int. Cl.
H01L 41/08 (2006.01)
(52) U.S. Cl.
USPC .................................................. 310/323.02
(58) Field of Classification Search
USPC .................. 310/326, 323.01–323.04, 323.15, 310/323.06, 323.07, 323.09, 316.01, 310/316.02, 328, 352, 311, 320, 321, 309, 310/310, 353; 356/4.01, 4.02, 4.05, 28.05, 356/28, 26
IPC ........................................................ H01L 41/08
See application file for complete search history.

(56) References Cited

U.S. PATENT DOCUMENTS

| 4,041,335 | A | 8/1977 | Nagata et al. |
| 4,884,002 | A | 11/1989 | Eusemann et al. |
| 5,965,968 | A * | 10/1999 | Robert et al. ................ 310/310 |
| 7,999,921 | B2 * | 8/2011 | Herbst et al. ................ 356/4.01 |
| 2004/0090146 | A1 | 5/2004 | Miyazawa |
| 2009/0001854 | A1 * | 1/2009 | Sakano ........................ 310/326 |
| 2011/0198969 | A1 * | 8/2011 | Furuhata et al. ............. 310/321 |

FOREIGN PATENT DOCUMENTS

WO     2006/008318 A    1/2006

* cited by examiner

Primary Examiner — Thomas Dougherty
Assistant Examiner — Karen B Addison
(74) Attorney, Agent, or Firm — Maschoff Brennan

(57) ABSTRACT

The invention relates to a piezo drive, in particular for use in geodesic devices, having at least one piezoelectric motor element that includes an advancing component, a running surface component, and a receptacle for the running surface component, wherein said receptacle is to be connected to a component to be driven, wherein the piezoelectric motor element has a window of operation of the motor as a frequency range of the movement of the advancing component. The running surface component and the receptacle are sized and connected to one another such that the natural resonances of the running surface component lie outside the window of operation of the motor.

24 Claims, 5 Drawing Sheets

PIEZO DRIVE

FIELD OF THE INVENTION

The invention relates to a peizo drive, in particular for use in geodesic or coordinate measuring machines.

BACKGROUND

In many precise devices such as, for example, geodesic measuring machines, it is necessary for components or the entire machine to move. In this case, the movement must be performed precisely and, in the case of dynamic applications, also with satisfactory speed, it mostly being presumed that there are high accuracies for startup and/or repetition. In addition, the field worthiness of machines fundamentally requires robustness of the drive, low power consumption and a reliable operation within a wide temperature range.

Examples of such measuring machines are theodolites or tachymeters, which—including in conjunction with integrated automatic target acquisition and target tracking devices—are used for multifarious, measurement tasks, consideration being given both to data acquisition and a pure supervision such as, for example, in building supervision. Other measuring machines are, for example, scanner systems that use the scanning method to record topographies of surfaces as three-dimensional point clouds, or measuring machines, for example, coordinate measuring machines for high accuracy surface measurement involving contact or without contact.

In solutions known to date from the prior art, use is made for these purposes of piezo systems that provide the drive for pivoting or displacing the components. Such micromotors have spatially acting piezoelectric vibrators with contact elements as drive elements that act on an appropriately shaped running surface or friction rail and thus permit optimized movement given tuning of the piezoelectric vibrator and tuned running surface. The spatially vibrating or oscillating movement is effected by the tuned arrangement and interconnection of piezoelectric materials whose contact element, acting on the running surface, is caused, by being suitably controlled, to execute a driving, for example elliptical, movement.

Such piezoelectric systems operated in a vibrating fashion can be used in a drive for measuring machines as micromotors for various movements when running surfaces are designed in a fashion tuned to correspond to the requirements of the geodesic measuring machine. Mostly, measuring machines require both a fast movement mode with a high speed, and a mode for high precision, positioning employing the lowest speeds.

Thus, for example, WO 2006/008318 discloses a geodesic measuring machine exhibiting such a drive concept. This measuring machine has a holder for positioning the measuring machine, and a measuring component with an optical beam path for measuring a target, the measuring component being supported in an aligning component that can be moved relative to the holder and being able to be moved with respect to the aligning component. The optical beam path is modified by at least one piezo drive as a combination of the driving component with a contact element being fed and a running surface connected to the component to be adjusted.

In this case, interaction between the contact element and running surface produces a fundamentally linear movement, a feed being effected by the contact element, which makes contact with the running surface under pressure. This coupling transmits an onward driving force that permits direct positioning by the backlash-free movement. The linear feed can also be converted into rotating or rotary movements by a suitable shaping of the running surface.

Such linear or rotary drives with resonance-operated piezo ultrasound motors are currently the prior art, commercially available drives having resonance frequencies in the range of 50-200 kHz. Owing to the oscillating behavior, however, problems may arise in conjunction with a corresponding running surface geometry. Given finite running surfaces with free ends that can, in addition, be supported in a floating and damped fashion, standing waves that can influence the motor are not produced. This is different in the case of rotating drives that have annular running surfaces, or for vibrating running surface geometries with fixed ends, it being possible for the disadvantageous influences to be further increased by insufficient or nonexistent damping.

In the case of rotating drive configurations, it is mostly a ring made from hard material that is used as running surface component, the result being to reduce wear. However, at the same time it is necessary to effect a high level of friction in order to attain a good feed effect. Common materials in this case are metals with a hard layer or ceramic components. High precision movements and alignments of the components require an accurate centering of the running surface in relation to the center of rotation, that is to say typically with a deviation of between 0.01 and 0.3 mm so as to ensure a uniform running behavior. The aim in this case is for the ring and the ring suspension not to change their properties with temperature, or to do so only within certain limits. Typical environmental conditions in geodesic instrumentation that are currently valid are operating temperatures of −2.0 to +60° C., storage temperatures of −40 to 80° C., and humidities of 0-95% relative air humidity across the temperature range.

High demands result, in particular, from the fact that the ceramic component must be connected to the suspension in a fashion that is stable, accurate and unchanging with time and environmental conditions. However, problems arise from the fact that the two components—suspension and ring—have different thermal expansion behaviors. In addition, ceramic rings have only a weak and statistically strongly scattered tensile strength, although they do possess advantages in compressive strength. Moreover, power losses and noise generation and/or vibrations can result from the interaction of the piezoelectric vibrator with the running surface component, there being a dependence on the geometry of the running surface component.

SUMMARY

One object of the present invention consists in providing an improved piezo drive, in particular for high precision machines such as, for example, geodesic instruments.

A further object consists in reducing undesired vibrations and noise generation in the case of piezo drives.

A further object consists in increasing the power, and/or in reducing power losses in the case of piezo drives.

The invention is based on the realization that the problems occurring are largely influenced by the dynamics of the drive component as an interacting system of a driven piezoelectric vibrator and a running surface that makes contact therewith. In particular, the excitation of natural vibrations of the running surface component leads to occurrence of power losses and to noise generation. What have emerged here as decisive variables are the geometries of the running surface component and the receptacle thereof, and also the configuration of the connection of these two parts.

According to the invention, the components and their connection are now designed such that potentially interfering resonances in the running surface component and the receptacle thereof are located or displaced such that they come to lie outside the frequencies in the operation window of the piezoelectric vibrator and/or the piezoelectric drive. The spacings of the running surface natural resonances are to lie as far as possible from one another and be of the lowest, possible order. The aim here is to ensure this for all operating states and across all environmental conditions.

The basis for this is the optimized influencing of the vibration behavior by mechanical decoupling and damping for the running surface component and the receptacle thereof.

To this end, the running surface component and receptacle are preferably connected by at least one intermediate layer, for example in a form of bonding that has decoupling and/or damping properties, the configuration of a bonded connection with an elastic character being, in particular, used according to the invention in order to optimize the drive behavior. In addition to the selection of the suitable adhesive, the adhesive gap and running surface geometries are, in particular, tuned to one another and, if appropriate, the bonding is optimized by adding filling materials such that the resonances do not come to lie in the operation window. In order for the system to remain easy to calculate, the natural frequencies of the running surface component are to be influenced as little as possible by the bonding, and the frequencies are to be transmitted as little as possible. This achieved by an adhesive that is as soft as possible, for example Shore-A hardness approximately 30. Since the strength of the adhesive influences the natural, resonances of the bonded running surface component, these can be adapted by the admixture of filling materials. The adhesive gap thickness, adhesive gap width and the amount and type of filling materials are selected in this case such that the natural frequencies of the system do not overlap with the resonance frequency of the motor.

Here, the system components can be adjusted precisely to one another during the bonding operation. In addition to being excited by its natural frequencies, as vibrating system the running surface component also influenced by the piezoelectric motor. When these vibration amplitudes of the running surface component become too large, this can substantially reduce the efficiency of the motors or lead to considerable noise. In order to prevent this, the ring amplitude should be damped, and this can be achieved by using a likewise soft adhesive for bonding or placing at the rear.

It emerges, moreover, that an additional damping layer or damping action of the intermediate layer also enlarges the temperature range within which the interference and/or power losses can be reduced. In this case, the required damping and fixed characteristic thereof are dependent both on the transmission energy of the motor—which there is no desire to reduce—and on the damping by the system components.

BRIEF DESCRIPTION OF THE DRAWINGS

The inventive piezo drive is described, or explained, in more detail below purely by way of example with the aid of exemplary embodiments illustrated schematically in the drawing. In detail.

DETAILED DESCRIPTION

Figure 1:
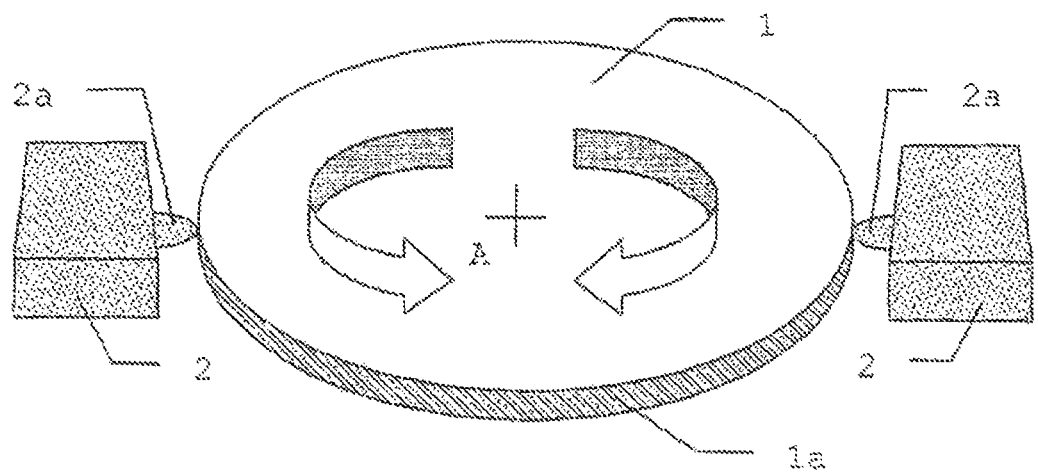
FIG. 1 is a schematic of a rotating drive provided by piezoelectric micromotors.

The schematic of FIG. 1 shows a piezo drive having a rotor 1 that is to be driven and has a running surface 1a that makes contact with a contact element 2a of a piezo motor 2 that transmits movement. As an element that picks up movement, the running surface 1a converts the movement of the contact element 2a into the desired movement, in this example a rotation of the rotor 1 about an axis A.

The movement is produced in this case by a combination of resonances of the piezoceramic elements of the piezo motor that cause an oscillating movement of the contact element 2a. This movement is transmitted by friction to the running surface 1a, and thus to the rotor 1 to be driven.

The drive can be effected here both by a single piezo motor 2 and by a plurality of such drive elements. Two piezo motors 2 are illustrated in an equally acting arrangement in FIG. 1, in a purely exemplary fashion. In this example, two piezo motors 2 act as an endless drive for the rotor 1 with a circular ceramic surface as running surface 1a. By way of example, the rotation of such an element can lead to the formation of the optical beam path of a measuring component in a way that may be moved and fixed.

Figures 2A, 2B:
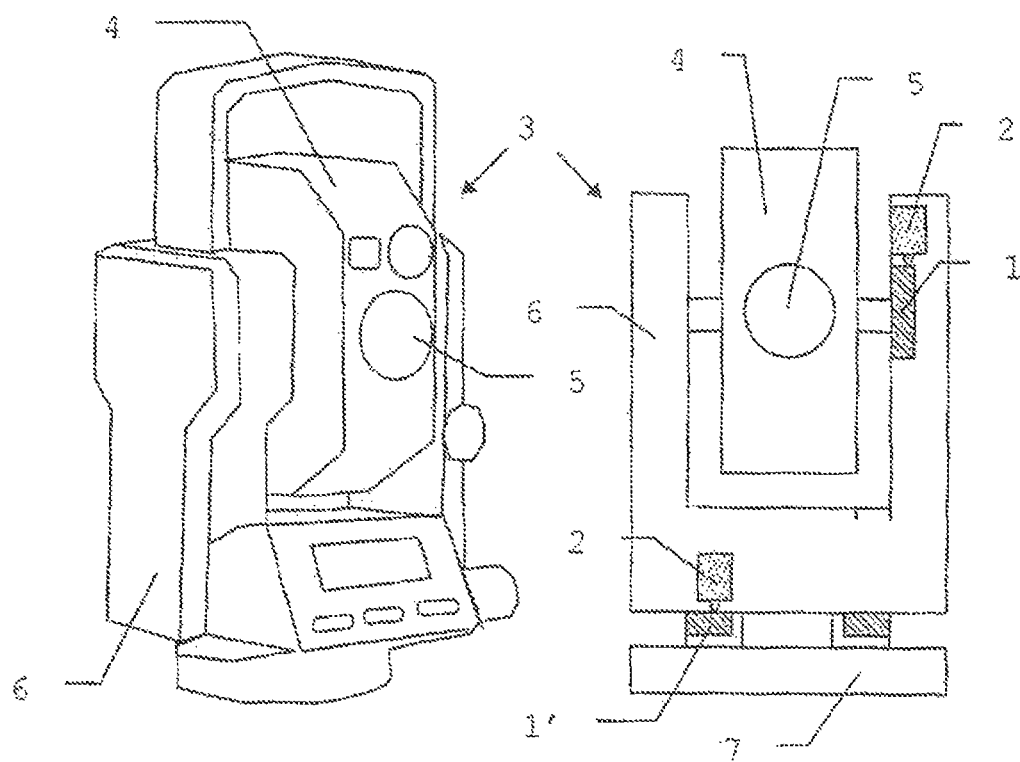
FIGS. 2a-b show a theodolite, figuratively and schematically, as a first example of the use of an inventive piezo drive.

FIGS. 2a-b a theodolite, figuratively and schematically, as a example of the use of an inventive piezo drive. A total station is illustrated in FIG. 2a as a geodesic measuring machine 3 with an aligning component 6 and a measuring component 4. The measuring component 4 has an objective 5 via which a beam path to a target to be measured is defined. The aligning component 6 can be pivoted about a vertical axis in relation to a holder (not illustrated here). By mounting the measuring component 4 in the aligning component 6, the measuring component 4 can be moved about a horizontal tilt axis. The mobility about vertical and tilt axes permits the acquisition of a large solid angle range which permits a complete acquisition of the surrounding space given a design having a transit measuring component 4.

FIG. 2b is a simplified schematic of the same measuring machine 3. The measuring component 4 with the objective 5 is supported by an axle such that it can rotate in relation to the aligning component 6. As component to be driven, the axle has a rotor 1 with a curved running surface that is assigned a piezo motor as drive, the latter making contact radially with the running surface, that is to say on its outer surface, and effecting a rotation about the tilt axis.

The emission of radiation for measuring the target can be performed via the objective 5, or else via an additional beam path, which is parallel to the optical axis of the objective and has a distance measuring unit, emitting a laser radiation, and an assigned mirror such that the environment can be scanned by moving the measuring component 4. A rotation of the aligning component 6 about the vertical axis is performed by a second piezo motor 2 as aligning motor that makes contact with an inner running surface 1' arranged in the holder 7, doing so axially or with an end face. This aligning motor can rotate the aligning component 6 in relation to the holder 7, the arrangement acting as an endless drive. Owing to the cooperation of the two piezo motors, the beam path can be moved and aligned about two axes and can therefore be modified. The axial contact or contact on the end face and/or the corresponding aligning of the drive component is not restricted here to the axes illustrated, but can also be applied for the respective other axis or other axes.

Figure 3:
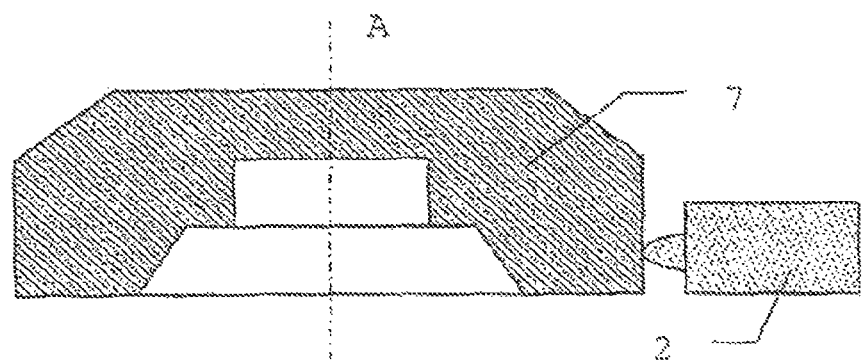
FIG. 3 shows a schematic of the fundamental principle of a rotating piezo drive.

The fundamental principle of a rotating piezo drive is explained in FIG. 3 with the aid of a cross section through a rotor 7. In this example, the rotor 7 is fashioned monolithically from ceramics and makes radial contact with its outer surface with the piezo motor such that upon being fed it rotates about the axis A. However, there are also known from the prior art composite drive elements such as are illustrated in FIGS. 4 and 5.

Figure 4:
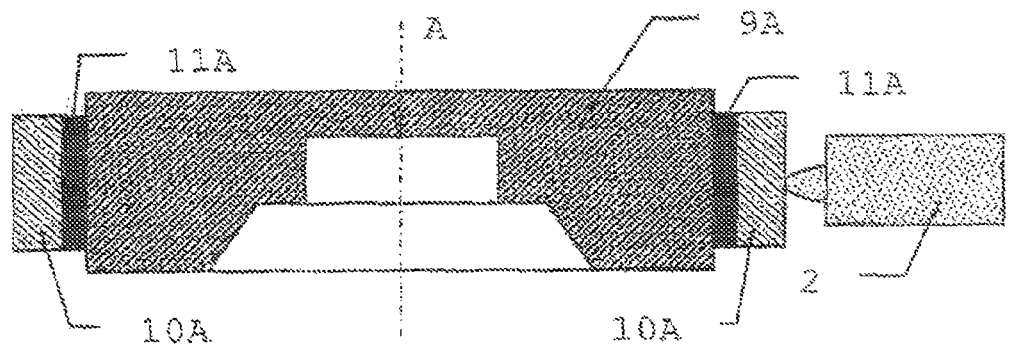
FIG. 4 shows a schematic of a first embodiment of a piezo drive of the prior art.
Figure 5:
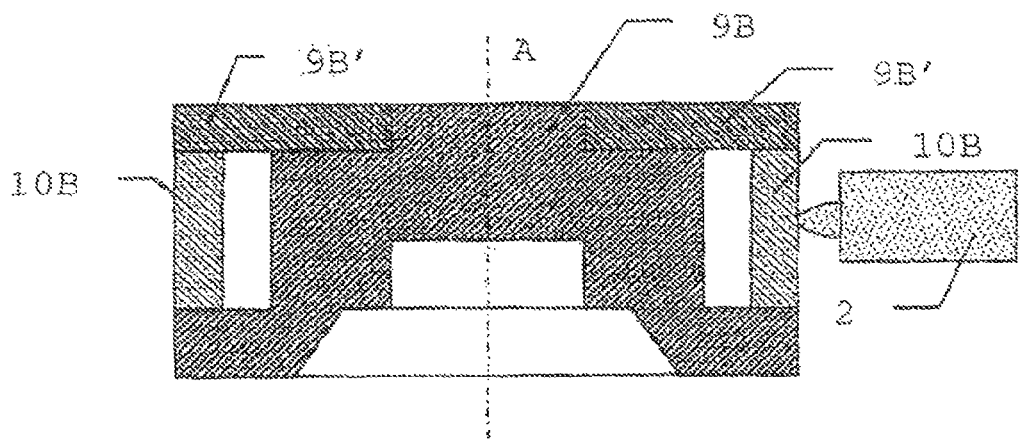
FIG. 5 shows a schematic of a second embodiment of a piezo drive of the prior art.

Here, FIG. 4 is a schematic of a first embodiment of a piezo drive of the prior art, having as running surface component 10A a ceramic ring bonded onto the circumference of a supporting rotor as receptacle 9A. In this case, an intermediate layer is formed as adhesive layer 11A between the running surface component 10A and receptacle 9A, the adhesive layer leading in the cured state to a fixed, non-elastic connection. Here, the ceramic ring or the overall system composed of ceramic ring and receptacle 9A, constitutes a vibrating system whose natural frequencies are excited by the piezo motor 2 and that can interfere with the resonance frequency of the piezo motor 2. This influencing of the piezo motor 2 by the natural resonances of the running surface component 10A can lead to a complete failure of the motor or of its feeding action when the two resonances exert a negative mutual influence. This is the case, for example, when pending vibrations and oscillating feed movements behave in antiphase, that is to say during the feed movement of the contact element the surface of the ceramic ring 10A bends inward at the contact point and therefore away from the contact element such that the friction lock is reduced or completely canceled out.

Aside from the pure excitation frequency, given a sufficient damping additional resonances can be excited in the drive element 2 of the running surface component 10A or in the receptacle 9A. Unfavorable overlapping of these frequencies can also cause other components that are mechanically connected to the running surface component 10A or other components to vibrate at audible frequencies and cause noise that can, depending on frequency, render the drive unusable for the user and in an inhabited zone.

A complicated factor is that the natural resonances of the ring system can shift via the temperature, which means that the noise generation exhibits a temperature dependence. In addition, this configuration according to the prior art has the disadvantage that the different thermal expansion of the running surface component 10A and the receptacle 9A cannot be compensated by the adhesive layer 11A, since the latter is virtually incompressible and enormous compressive forces in this layer. Because of the temperature dependence of these stresses, the vibrating behavior is likewise temperature dependent, the result being strong thermally conditioned resonance displacements.

A further quality feature of a piezo drive is the synchronism, that is to say the extent of concentricity fluctuations. Depending on the design of the piezo motor, the concentricity of the ceramic ring is a decisive condition for this. An adjustability of the ceramic ring in the course of the assembly procedure is hereby advantageous.

FIG. 5 is a schematic of an alternative connection of the running surface component and receptacle. Here, as the running surface component 10B the ceramic ring is fixed mechanically by a clamping ring 9B' in relation to the receptacle 9A, parallel bonding being possible. With regard to the temperature, dependence and/or thermal expansion, this configuration has similar disadvantages to the example illustrated in FIG. 4, and has no damping effect.

Figure 6:
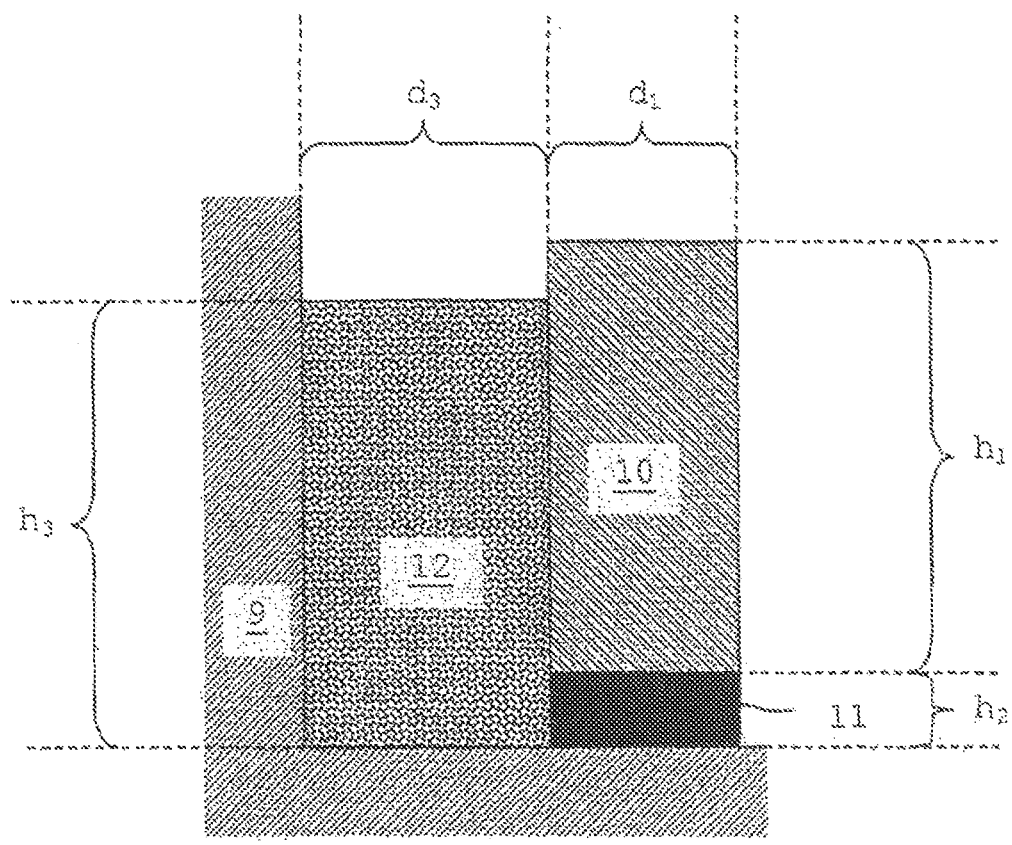
FIG. 6 shows a schematic of system components of an inventive piezo drive.

FIG. 6 is a schematic of system components of an inventive piezo drive.

The running surface component 10 with a thickness $h_1$ and a width $d_1$ is connected to the receptacle 9 by a first intermediate layer designed as adhesive layer 11 of thickness $h_2$. Additionally, a further intermediate layer, designed as damping layer 12 of thickness $d_3$ and width $h_3$ can be introduced between the running surface component 10 and the receptacle 9. In this arrangement, the adhesive layer 11 and damping layer 12 are arranged on two different surfaces of the running surface component 10. Fundamentally, however, the two layers or intermediate, layers can also be fitted in another arrangement, for example be arranged on the same side. Again, the functionality of the two layers can be integrated in a single layer, for example, by admixing in the adhesive layer 11 filling materials that, for example, can serve both as spacers and to increase the internal friction, and effect a targeted reinforcement of the intermediate layer.

Figure 7:
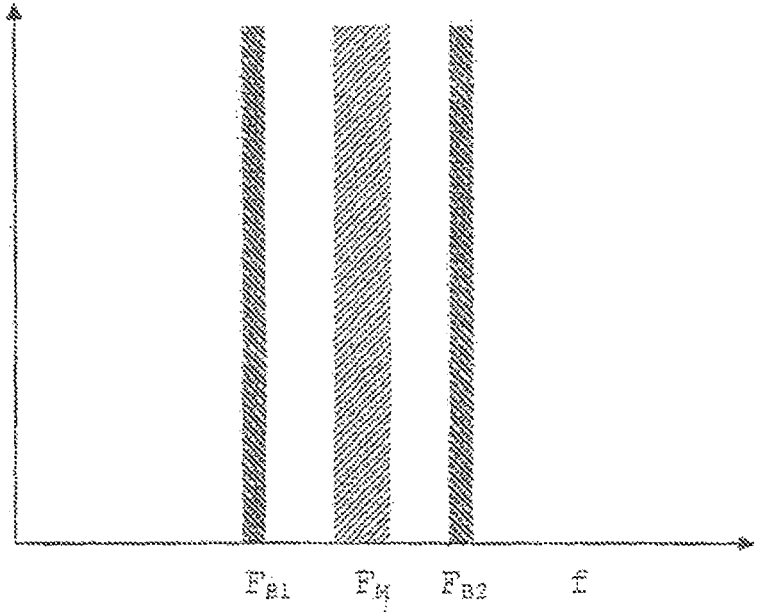
FIG. 7 shows a schematic of the principle on which the inventive piezo drive is based.

FIG. 7 is a schematic that explains the principle on which the inventive piezo drive is based. What are illustrated are the frequency band of the piezo motor as motor operation window $F_M$ and two exemplary frequency bands of the natural resonances of the running surface component $F_{B2}$ and $F_{B2}$. According to the invention, the running surface component and receptacle are dimensioned and interconnected such that the natural resonances of the running surface component lie outside the motor operation window, that is to say do not overlap therewith. In addition or as an alternative, the running surface component and receptacle can be connected to discrete contact points, their number being unequal to the number of the bending modes of the running surface component in the motor operation window. This connection by means of discrete contact points can be effected both by means of adhesive, and also without, for example by clamping connections.

Figure 8:
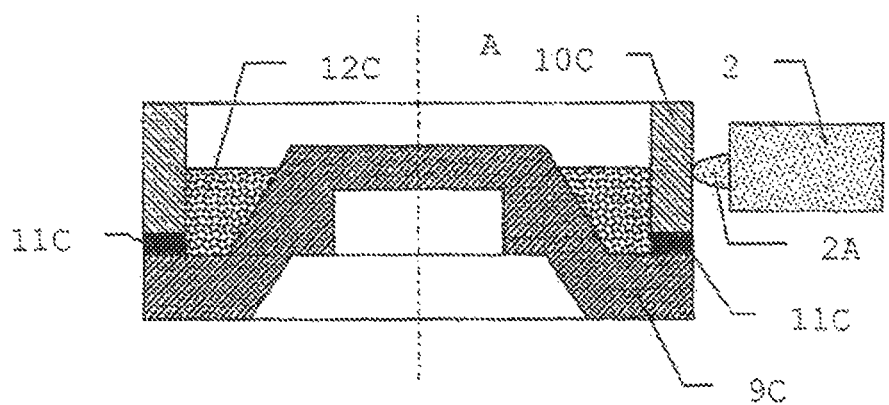
FIG. 8 shows a schematic of a first embodiment of the inventive piezo drive for rotary movements.

FIG. 8 is a schematic of a first embodiment of the inventive piezo drive for producing rotary movements. The piezo drive has at least a piezoelectric motor element 2 having a feed component 2A, a running surface component 10C for making contact with the feed component 2A, and a receptacle 9C for the running surface component 10C for connecting to a component to be driven. The running surface component 10C is designed as a ceramic ring with a curved running surface, in particular made from $Al_2O_3$, and an adhesive layer 11C and a damping layer 12C for damping vibrations of the running surface component 10C are arranged between the running surface component and receptacle, the ceramic ring being bonded at its end face onto the receptacle 9C, and the damping layer 12C being arranged on the inside of the ceramic ring.

This has the advantage that the ceramic ring floats on the adhesive upon assembly, and it is therefore easily possible to adjust the concentricity.

The piezoelectric motor element has a motor operation window, dependent on temperature and the drive, as frequency range of the movement of the feed component, the running surface component 10C and receptacle 9C being dimensioned and interconnected such that, for customary operating temperatures, for example between −40° Celsius and +50° Celsius, the natural resonances of the running surface component 10C lie outside the motor operation window. The adhesive layer 11C and/or damping layer 12C should exhibit a viscoelastic forming behavior and have a Shore A hardness of between 25 and 35, in particular 30. Partially crystalline polymers, for example polyarylamide, in particular with fiber reinforcement, 2-component polysulfide or epoxy resin may be used as suitable damping means or adhesive.

In this case, both layers can have filling materials, in particular mineral particles, glass, plastic and/or ceramic beads. Depending on dimension and material, these filling materials can increase the internal friction and thus the dissipation.

For use in geodesic machines, the ceramic ring can have a diameter of between 40 and 150 mm and a running layer width of between 1.5 and 10 mm, and the adhesive layer has a thickness of between 0.05 and 0.2 mm, natural modes being avoided in the audible range between 1 kHz and 15 kHz, in particular between 6 and 8 kHz.

A further inventive possibility for reducing or avoiding resonant effects consists in designing the running surface component as an asymmetric component or as an asymmetric ring or with a multipartite, that is to say interrupted running surface.

Figure 9:
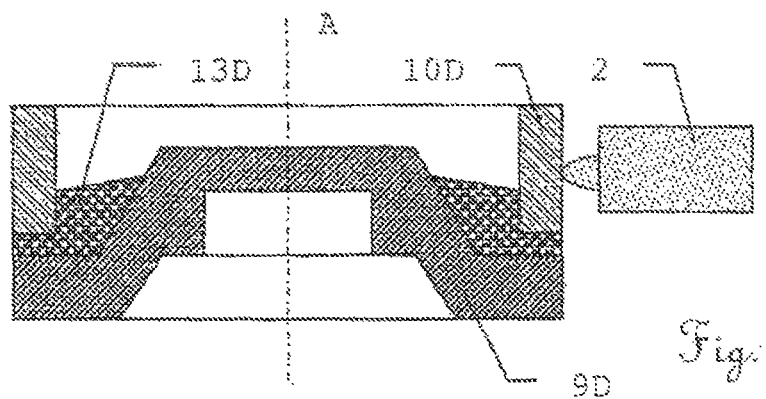
FIG. 9 shows a schematic of a second embodiment of the inventive piezo drive for rotary movements.

FIG. 9 is a schematic of a second embodiment of the inventive piezo drive for rotary movements. The design with a ceramic ring as running surface component 10D and receptacle 9D corresponds to the first embodiment illustrated in FIG. 8. However, no use is made of separate and differently designed layers for bonding and damping. The two effects are now accomplished by a single intermediate layer as adhesive layer 13D that, in addition, also comprises the properties of the damping layer, something which can be implemented, for example, by the use of filling materials. In this example, the bonding contact between the running surface component 10D and receptacle 9D is performed both at an end face and on the end side of the ceramic ring.

Figures 10A, 10B, 10C:
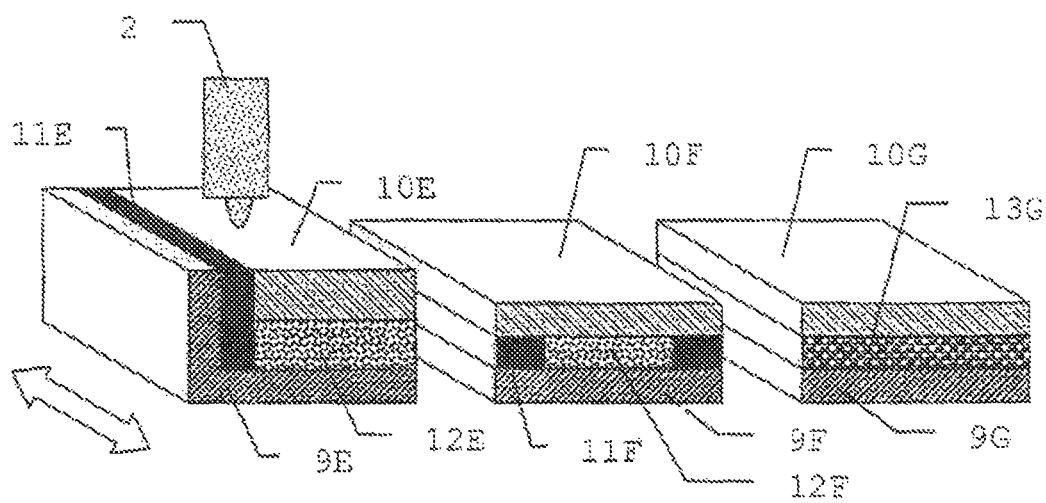
FIGS. 10a-c show schematics of a third, fourth and fifth embodiment of the inventive piezo drive for linear movements.

A driver configuration for producing a linear movement or a rotary movement with the axial contact such as illustrated in FIG. 2b, for example, is explained in FIGS. 10a-c with the aid of a third, fourth and fifth embodiment of the inventive piezo drive.

FIG. 10a shows an elongated running surface component 10E that is connected on its narrow side via an adhesive layer 11E to a limb of the receptacle which is of angular design. A damping layer 13E of adhesive nature is arranged on the wide surface of the running surface component so as to result in a planar connection to the receptacle on this side as well. Owing to the angular design and to the likewise fixing effect of the damping layer 13E, the running surface component 10E can be fastened in a fashion that is aligned with the two longitudinal axes and defined.

In the case of the fourth embodiment of the inventive piezo drive that is illustrated in FIG. 10E, the running surface component 10F and receptacle 9F are connected by adhesive layers 11F in the form of two strips between which the damping layer 13F is introduced. If the intermediate layer acting as damping layer 13F is designed with a layer thickness exceeding the thickness of the adhesive layer 11F in the bonded state, it is also possible for the damping layer 13F to be precompressed and/or prestressed.

An approach similar to the second embodiment in FIG. 9 and having a uniform layer is illustrated in FIG. 10c as fifth embodiment for the case of a linear movement. Here, as well, adhesive and damping functionalities are integrated in a uniform adhesive layer 13G, which is arranged between the running surface component 10G and receptacle 9G in a fashion making full area contact. The resulting design is therefore of a simple sandwich nature.

Figure 11:
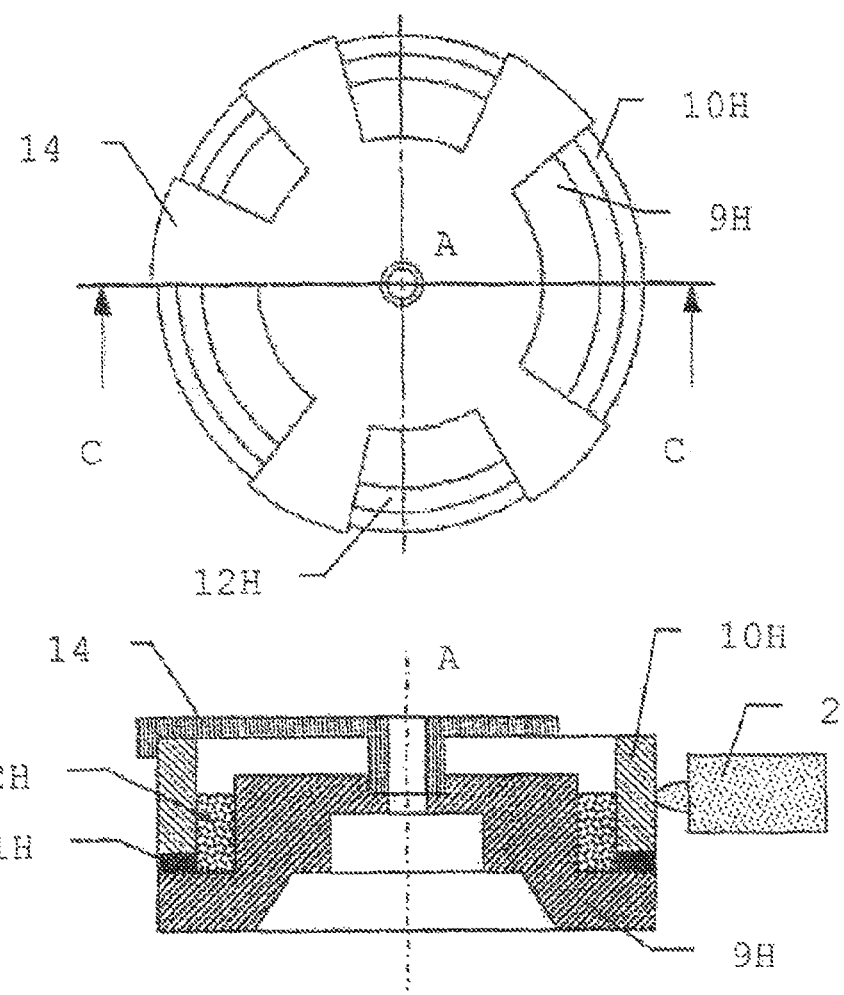
FIG. 11 shows a schematic of a sixth embodiment of the inventive piezo drive for rotary movements with a clamp connection.

FIG. 11 is a schematic of a sixth embodiment of the inventive piezo drive for rotary movements, having a clamping connection, the upper illustration corresponding a plan view, and the lower illustration to a section along the line CC. Here, as well, the running surface component 10H is of annular design, its connection to the receptacle 9H being performed by clamping in an axial direction. To this end, a clamping element 14 is used as holder that presses the running surface component 10H against a soft elastomeric layer as intermediate layer that, in turn, is fitted on the receptacle 9H. In addition, a further intermediate layer is arranged as damping layer 12H between the receptacle 9H and running surface element 10H. By way of example, plastic or metal can be used as the material of the clamping element 14, a creep-resistant spring effect being advantageous so as to result in a resilient bracing. The contact force produced by the clamping element 14 should here remain sufficiently constant even over the temperature and humidity ranges to be expected under operating conditions. In addition, during the assembly the clamping element 14 exerts a centering effect on the running surface component 10H.

In order to suppress or prevent the appearance of resonant effects, in this example the clamping element 14 is designed with a symmetric geometry and a discrete number of contact surfaces.

Figure 12:
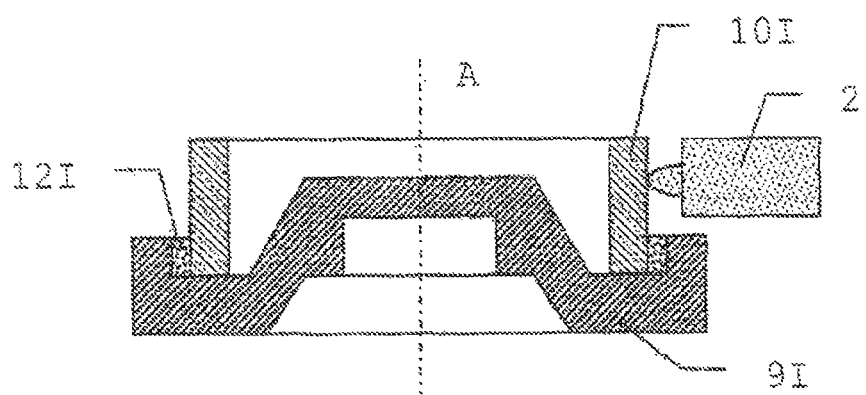
FIG. 12 shows a schematic of a seventh embodiment of the inventive piezo drive for rotary movements with a shrink-on connection.

FIG. 12 is a schematic of a seventh embodiment of the inventive piezo drive for rotary movements, in the case of which the running surface component 10I is of annular design, for example a ceramic ring, and is connected to the receptacle 9I by means of a shrink-on connection acting in the radial direction. To this end, an intermediate layer is introduced as damping layer 12I between the running surface component 10I and receptacle 9I, for example by extruding or vulcanizing the receptacle 9I before it is shrunk fit. This intermediate layer is in this case at least a few micrometers thick and is fabricated from creep-resistant material, for example plastic or elastomer. The interplay of the receptacle 9I and damping layer 12I also permits instances of out-of-roundness of the running surface component of the ceramic ring to be elastically absorbed and compensated. The process of shrink fitting includes a heating of the receptacle 9I with subsequent insertion of the running surface component 10I and cooling. The basic material of the receptacle 9I should have an expansion coefficient similar to the ceramic ring.

In the case of this embodiment, the receptacle 9I can be designed both in the form illustrated as a disk, and thus symmetrically, and also, alternatively, in a way similar to FIG. 11, having asymmetric geometry.

It is evident to the person skilled in the art that, depending on the application and the movement to be effected, the various components can have different geometries, and therefore also deviating connecting characteristics. In addition, alongside hard metals and ceramics, it is also possible to implement the running surfaces by using other materials suitable for the respective field of application. The bonding connections and damping layers are generally illustrated, as continuous and planar. However, according to the invention interrupted connections can also be implemented, for example by the formation of isolated webs or the introduction of cutouts in layers that are otherwise homogeneous and continuous.

What is claimed is:

1. A geodesic or coordinate measuring machine including a piezo drive, comprising:
   at least one piezoelectric motor element having a feed component;
   a running surface component for making contact with the feed component; and
   a receptacle for the running surface component for connecting to a component to be driven,
   the piezoelectric motor element having a motor operation window as frequency range of the movement of the feed component, wherein the running surface component and receptacle are dimensioned and interconnected such that the natural resonances of the running surface component lie outside the motor operation window, and wherein the running surface component has a curved running surface.

2. The geodesic or coordinate measuring machine as claimed in claim 1, wherein the running surface component is made from ceramic.

3. The geodesic or coordinate measuring machine as claimed in claim 1, wherein the running surface component and receptacle are dimensioned and interconnected such that the natural resonances of the running surface component lie outside the motor operation window about a temperature range of −20 to +60° C.

4. The geodesic or coordinate measuring machine as claimed in claim 1, wherein the running surface component is of annular design and is connected to the receptacle by a shrink-on connection acting in a radial direction.

5. The geodesic or coordinate measuring machine as claimed in claim 1, wherein the running surface component is of annular design and clamped onto the receptacle, or is resiliently braced therewith, in an axial direction.

6. The geodesic or coordinate measuring machine as claimed in claim 1, further comprising at least one intermediate layer between the running surface component and receptacle.

7. The geodesic or coordinate measuring machine as claimed in claim 1, wherein the running surface component and receptacle are connected to discrete contact points, their number being unequal to the number of bending modes of the running surface component in the motor operation window.

8. The geodesic or coordinate measuring machine as claimed in claim 1, wherein the running surface component is designed as an asymmetric ring or with a multipartite, interrupted running surface, or is fixed by a receptacle or holder with an asymmetric geometry.

9. The geodesic or coordinate measuring machine as claimed in claim 1, wherein the running surface components has no natural resonances in the audible frequency range between 1 and 15 kHz.

10. The geodesic or coordinate measuring machine as claimed in claim 1, wherein the running surface components has no natural resonances in the audible frequency range between 6 and 8 kHz.

11. The geodesic or coordinate measuring machine as claimed in claim 1, further comprising at least one intermediate layer exhibiting viscoelastic forming behavior between the running surface component and receptacle.

12. The geodesic or coordinate measuring machine as claimed in claim 6, wherein the intermediate layer has a Shore-A hardness between 20 and 50.

13. The geodesic or coordinate measuring machine as claimed in claim 6, wherein the intermediate layer has a Shore-A hardness of 30.

14. The geodesic or coordinate measuring machine as claimed in claim 6, wherein the intermediate layer has filling materials.

15. The geodesic or coordinate measuring machine as claimed in claim 6, wherein the intermediate layer has mineral particles, glass, plastic and/or ceramic beads.

16. The geodesic or coordinate measuring machine as claimed in claim 6, wherein the intermediate layer is formed from 2-component polysulfide, epoxy resin, a partially crystalline polymer, or polyarylamide.

17. The geodesic or coordinate measuring machine as claimed in claim 16, wherein the intermediate layer is formed with fiber reinforcement.

18. The geodesic or coordinate measuring machine as claimed in claim 6, wherein the intermediate layer is designed as an adhesive layer for connecting the running surface component and receptacle.

19. The geodesic or coordinate measuring machine as claimed in claim 6, wherein the intermediate layer is designed as a damping layer between the running surface component and receptacle such that vibrations of the running surface component are damped.

20. The geodesic or coordinate measuring machine as claimed in claim 6, wherein the running surface component is designed as an annular running surface component.

21. The geodesic or coordinate measuring machine as claimed in claim 6, wherein the running surface component has a curved running surface designed as an annular running surface component.

22. The geodesic or coordinate measuring machine as claimed in claim 20, wherein the running surface component is designed as a ceramic ring and the intermediate layer is arranged as damping layer, and a further intermediate layer is arranged as adhesive layer, between the running surface component and receptacle, the ceramic ring being bonded at its end face with the receptacle, and the damping layer being arranged on the inside of the ceramic ring.

23. The geodesic or coordinate measuring machine as claimed in claim 20, wherein the running surface component is designed as a ceramic ring made from $Al_2O_3$ and the intermediate layer is arranged as damping layer, and a further intermediate layer is arranged as adhesive layer, between the running surface component and receptacle, the ceramic ring being bonded at its end face with the receptacle, and the damping layer being arranged on the inside of the ceramic ring.

24. The geodesic or coordinate measuring machine as claimed in claim 22, wherein the ceramic ring has a diameter of between 40 and 150 mm and a running layer width of between 1.5 and 10 mm, and the adhesive layer has a thickness of between 0.05 and 0.3 mm.

* * * * *